US012618398B2

(12) United States Patent
Wu et al.

(10) Patent No.: US 12,618,398 B2
(45) Date of Patent: May 5, 2026

(54) ACTIVE PRESSURE COMPENSATOR FOR DEEP-SEA SAMPLING AND PRESSURE COMPENSATION METHOD THEREOF

(71) Applicant: ZHEJIANG UNIVERSITY, Hangzhou (CN)

(72) Inventors: Shijun Wu, Hangzhou (CN); Zhiheng Chen, Hangzhou (CN); Yiqiang Dai, Hangzhou (CN); Canjun Yang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 179 days.

(21) Appl. No.: 18/599,216

(22) Filed: Mar. 8, 2024

(65) Prior Publication Data

US 2024/0376886 A1    Nov. 14, 2024

(30) Foreign Application Priority Data

May 11, 2023    (CN) .......................... 202310527036.4

(51) Int. Cl.
F04B 9/04            (2006.01)
F04B 17/03           (2006.01)
(Continued)

(52) U.S. Cl.
CPC .............. *F04B 9/042* (2013.01); *F04B 17/03* (2013.01); *F04B 19/22* (2013.01); *F04B 49/08* (2013.01);
(Continued)

(58) Field of Classification Search
CPC .... G01N 2001/1031; G01N 2001/1427; F04B 9/042; F04B 11/0033; F04B 17/03; F04B 19/22; F04B 47/06–08; F04B 49/08
(Continued)

(56) References Cited

U.S. PATENT DOCUMENTS 3,153,347 A * 10/1964 Schutze ................ F04B 53/102
                                                              74/56
6,135,734 A * 10/2000 Isozumi .................. F02M 55/04
                                                              417/542
(Continued)

FOREIGN PATENT DOCUMENTS

CN          2680576 Y   *  2/2005
CN       101526444 A   *  9/2009
(Continued)

*Primary Examiner* — Alexander B Comley

(57)                ABSTRACT
An active pressure compensator for deep-sea sampling includes a spring chamber, a cam piston pump, and a circuit chamber; the spring chamber is configured to provide compensation liquid for the cam piston pump; the cam piston pump is configured to be able to draw liquid from the spring chamber and pump liquid to the circuit chamber; the circuit chamber is configured to be connected to a mechanism to be pressurized, and is provided therein with a pressure sensor and a control circuit board, the pressure sensor is configured to detect pressures of the compensation liquid from cam piston pump and the mechanism to be pressurized, the control circuit board is configured to control working of the cam piston pump based on pressure data feedback from the pressure sensor and thereby realize active pressure compensation for the mechanism to be pressurized. A pressure compensation method using the compensator is further provided.

17 Claims, 6 Drawing Sheets

(51) Int. Cl.

| | | |
|---|---|---|
| *F04B 19/22* | (2006.01) | |
| *F04B 49/08* | (2006.01) | |
| *G01N 1/10* | (2006.01) | |
| *G01N 1/14* | (2006.01) | |

(52) U.S. Cl.
CPC ................ *G01N 2001/1031* (2013.01); *G01N 2001/1427* (2013.01)

(58) Field of Classification Search
USPC ...................... 417/364, 470, 540–542; 74/56
See application file for complete search history.

(56) References Cited

U.S. PATENT DOCUMENTS

| | | | | | |
|---|---|---|---|---|---|
| 7,083,395 | B2 * | 8/2006 | Maiefski | ................ | F04B 15/08 417/228 |
| 7,604,462 | B2 * | 10/2009 | Inoue | ........................ | F04B 5/00 417/470 |
| 8,393,881 | B2 * | 3/2013 | Usui | ..................... | F04B 39/123 417/540 |
| 8,672,653 | B2 * | 3/2014 | Mancini | ............ | F02M 63/0265 417/540 |
| 8,727,752 | B2 * | 5/2014 | Lucas | ..................... | B27B 21/04 417/540 |
| 2005/0232787 | A1 * | 10/2005 | Roth | ........................ | F15B 21/14 417/364 |
| 2006/0127228 | A1 * | 6/2006 | Rohring | ................ | F04B 1/0413 417/215 |
| 2015/0292493 | A1 * | 10/2015 | Suzuki | ..................... | F04B 35/04 74/56 |
| 2022/0042499 | A1 * | 2/2022 | Zhou | ........................ | F04B 9/042 |

FOREIGN PATENT DOCUMENTS

| | | | | | |
|---|---|---|---|---|---|
| CN | 103397993 | B | * | 2/2016 | |
| CN | 106198109 | A | * | 12/2016 | ............... G01N 1/14 |
| CN | 111734333 | A | * | 10/2020 | ............ E21B 25/18 |
| CN | 111855305 | A | * | 10/2020 | ............ G05D 16/20 |
| CN | 111855307 | A | * | 10/2020 | ............... G01N 1/14 |
| CN | 212964181 | U | * | 4/2021 | |
| CN | 114459818 | A | * | 5/2022 | ............... F15B 3/00 |
| CN | 111855303 | B | * | 10/2023 | ............... G01N 1/14 |
| CN | 114459818 | B | * | 11/2023 | ............... G01N 1/14 |
| GB | 2550144 | A | * | 11/2017 | ............ F02M 59/46 |
| JP | H06229369 | A | * | 8/1994 | |
| JP | H07197880 | A | * | 8/1995 | |
| JP | H10318128 | A | * | 12/1998 | |
| KR | 100332263 | B1 | * | 8/2002 | ............ F04B 9/042 |
| WO | WO-2016127211 | A1 | * | 8/2016 | .......... G01N 1/2035 |

* cited by examiner

ACTIVE PRESSURE COMPENSATOR FOR DEEP-SEA SAMPLING AND PRESSURE COMPENSATION METHOD THEREOF

CROSS REFERENCE TO RELATED APPLICATIONS

The present application claims priority of Chinese patent application No. CN202310527036.4 filed on May 11, 2023. The entire content of the above-identified application is incorporated herein by reference.

TECHNICAL FIELD

The present invention relates to the technical field of deep-sea sampling and pressure maintenance, in particular to an active pressure compensator for deep-sea sampling and a pressure compensation method thereof.

BACKGROUND

The sea area with a depth exceeding 1000 m is defined as the deep sea, which accounts for 88% of the total ocean coverage area and 75% of the total ocean volume, and contains abundant mineral, biological, oil and gas, and genetic resources. As a type of deep-sea exploration technology, sampling detection technology brings back valuable samples in the ocean, such as minerals, microorganisms, water quality, etc., and provides important assistance for exploring marine resources and promoting research of biology, ecology, etc.

Pressure is an unneglectable influence factor when obtaining seabed samples. Pressure plays an important role in ensuring stability of samples and activity and integrity of microbial proteins. Moreover, pressure is also extremely important for maintaining not volatilizing dissolved gases and unchanged physical and chemical properties of hydrates in samples. For scenarios that require laboratory analysis of samples, it is not only necessary to ensure stable pressures of samples during sampling processes, but also necessary to ensure stable pressures during transfer processes after sample collection. Therefore, ensuring stability of sample pressures during sampling processes and researching pressure retention techniques are of great significance for sample fidelity and scientific research. The seawater pressure increases with the depth, reaching a maximum of over 110 MPa, which is located in the Mariana Trench at a depth of 10909 meters. In a process of sample recovery, the external seawater pressure continuously decreases. If measures are not taken to maintain a stable pressure, effectiveness of samples will be greatly reduced. Therefore, the research on deep-sea sampling pressure retention technology is of great significance.

In the field of water sampling, existing research work can be divided into non-pressure holding sampling, passive pressure holding sampling, and active pressure holding sampling in terms of whether pressure compensation is applied to samples. Non-pressure holding sampling refers to a sampling method that tolerates pressure loss during a recovery process without any pressure compensation after sample collection is completed. Non-pressure holding sampling is commonly used in fields such as that are insensitive to sample pressure, in shallow water sampling, and so on. Processes of sampling and recovery of non-pressure holding sampling inevitably result in pressure loss and is unable to maintain in-situ pressure. Passive pressure holding sampling is also usually known as accumulator sampling, this type of sampling scheme generally involves pre-charging pressure gas into an accumulator in advance. When the external environmental pressure decreases, the pre-charging gas in the accumulator is released to achieve pressure compensation for samples. Although passive pressure holding sampling is relatively convenient, it has characteristics such as dangerous operation and inaccurate pressure holding. Active pressure holding sampling achieves active pressure holding for pressures of samples through an external pressure compensation device, and detects pressures of collected samples in real time for pressure compensation. Active pressure holding sampling can actively adjust pressures of samples to ensure stable pressures of samples, but to some extent, it increases structural complexity. For example, Chinese patent application with public No. CN114459818A discloses an active liquid precision compensation device and method for deep-sea pressure maintaining samplers, which uses three sets of motors, reduction boxes, and screw nuts to respectively drive three piston boosting cylinders with different areas to pressurize a sampling cylinder, its structure is very complex. In addition, this scheme need rely on an environmental pressure and pushing forces from the motors to the screws to pressurize the piston booster cylinder; if the environmental pressure is low but a high pressure is still required to be output, requirements for the motors, reducers, and screw nuts are very high. For another example, Chinese patent application with the public No. CN113251148A discloses an active pressure compensation device and a deep-sea pressure holding sampling system, which uses an electric motor, gear transmission, and screw transmission to push a piston to pressurize compensation liquid. However, the pressurized compensation liquid only plays a role of preventing axial displacement of a sealing ring from causing pressure reduction, while cannot provide pressure compensation after pressure reduction; it is a gas accumulator that plays a compensation role after pressure reduction, the essence is passive pressure compensation, which cannot perform precise active pressure compensation. The device is complex in structure, uses gas compensation, and has low safety.

Therefore, overall, existing active pressure compensation devices have drawbacks such as complex structures, large volumes, low applicable pressures, limited use, and low safety.

SUMMARY OF THE DISCLOSURE

One purpose of the present invention is to provide an active pressure compensator for deep-sea sampling and a pressure compensation method thereof, the active pressure compensator has advantages of a simple structure, a small volume, a wide applicable pressure range, and a high safety.

The present invention provides an active pressure compensator for deep-sea sampling comprising a spring chamber, a cam piston pump connected to the spring chamber, and a circuit chamber connected to the cam piston pump, wherein the spring chamber is configured to provide liquid with a pressure higher than an environmental pressure by at least 0.5 MPa for the cam piston pump; the cam piston pump is configured to be capable of inhaling liquid from the spring chamber and pumping out liquid to the circuit chamber; the circuit chamber is configured to be connected to a mechanism to be pressurized, and is provided therein with a pressure sensor and a control circuit board connected in communication with the pressure sensor, the pressure sensor is configured to detect pressures of liquid output by the cam piston pump and of the mechanism to be pressurized, the control circuit board is configured to send a control instruction to control working of the cam piston pump based on pressure data feedback from the pressure sensor and thereby realize active pressure compensation for the mechanism to be pressurized.

Optionally, the cam piston pump comprises a liquid chamber, and a liquid inlet valve and a liquid outlet valve in communication with the liquid chamber; the liquid inlet valve and the liquid outlet valve are respectively connected to the spring chamber and the circuit chamber.

Optionally, the cam piston pump further comprises a piston that is movable along an axial direction of the cam piston pump, a stop rotating block connected to the piston, a roller assembly connected to the stop rotating block, a cam in linkage with the roller assembly, and a drive motor configured to drive the cam to rotate; wherein when the drive motor drives the cam to rotate, the cam applies an axial pushing force to the roller assembly, such that the roller assembly, through the stop rotating block, pushes the piston to move axially toward a direction approaching the liquid chamber, such that liquid in the liquid chamber is pumped out through the liquid outlet valve.

Optionally, both the liquid inlet valve and the liquid outlet valve are one-way valves.

Optionally, the piston is sheathed with a first a first elastic member, the first elastic member is configured to store elastic potential energy when the piston is pushed by the stop rotating block to move, and further configured to release elastic potential energy when the pushing force of the stop rotating block to the piston disappears, such that the piston, the stop rotating block, and the cam return to original positions; wherein when the piston, the stop rotating block, and the cam return to original positions, the cam piston pump inhales liquid into the liquid chamber through the liquid inlet valve.

Optionally, the cam piston pump comprises a piston chamber, an intermediate chamber connected to the piston chamber, a motor chamber connected to the intermediate chamber, and a motor cover connected to the motor chamber; wherein the liquid chamber, the liquid inlet valve, and the liquid outlet valve are provided in the piston chamber, the piston, the stop rotating block, the roller assembly, the cam, and the drive motor are provided in a hollow cavity running through the intermediate chamber and the motor chamber, and between the piston and the piston chamber there is provided with a combination sealing member for shaft, which is configured to seal the liquid chamber.

Optionally, among the piston chamber, the intermediate chamber, the motor chamber, and the motor cover, bolts or screws are used for connection.

Optionally, the cam piston pump further comprises a motor coupling configured to fix the drive motor in the motor chamber.

Optionally, the cam piston pump further comprises silicon carbide balls provided between the stop rotating block and the piston chamber, the silicon carbide balls are configured to perform circumferential restriction for the stop rotating block to avoid the stop rotating block from rotating; the stop rotating block has a front end, a middle end, and a rear end connected sequentially, the cam piston pump further comprises a piston coupling configured to connect the piston to the front end of the stop rotating block fixedly and an e-type retaining ring, and the cam piston pump further comprises a roller shaft provided at the rear end of the stop rotating block, the roller assembly is rotatably provided on the roller shaft.

Optionally, the cam has a linkage end and a drive end extending from the linkage end, the linkage end and the drive end are respectively connected to the rolling assembly and a rotation shaft of the drive motor, and between an outer side of the drive end and an inner side wall of the intermediate chamber there is further provided with a bearing assembly.

Optionally, the motor cover is provided with a first interface configured to be connected with an oil bag, a second interface configured to be connected with the circuit chamber, and a third interface configured to be connected with the motor chamber, wherein the first interface is in communication with the third interface.

Optionally, the spring chamber comprises a water supplement interface and a spring chamber end cover that are respectively provided at two ends thereof, a valve poppet configured to control the water supplement interface to open and close, a water supplement chamber in communication with the water supplement interface, a piston provided at a side of the water supplement chamber that is away from the valve poppet, a second elastic member having one end supported against the piston and another end inserted with the spring chamber end cover, and an accommodation chamber configured to mount the second elastic member.

Optionally, the piston is provided thereon with two guide rings and a sealing ring provided between the two guide rings.

Optionally, the circuit chamber comprises a casing, a circuit cavity formed in the casing, and an interface part and a pressure compensation part that are respectively provided at two ends of the casing; wherein the interface part is provided with a first connection interface configured to be connected with a watertight connector to perform debugging and communication for the control circuit board in the circuit cavity, and a second connection interface configured to be connected to the cam piston pump; the pressure compensation part comprises a pressure compensation inlet connected to the liquid outlet valve of the cam piston pump, a mounting cavity configured to mount the pressure sensor, a sensor plug configured to fix the pressure sensor in the mounting cavity, a copper post connected to the sensor plug and located in the circuit cavity, and a pressure compensation outlet in communication with the pressure compensation inlet and the mounting cavity; the control circuit board is mounted on the copper post, the circuit cavity is further provided therein with a battery, and the circuit chamber is configured to be connected to the mechanism to be pressurized through the pressure compensation outlet.

Optionally, the mechanism to be pressurized is a sampling tube.

Optionally, the active pressure compensator further comprises an oil bag connected to the cam piston pump; the active pressure compensator further comprises a mounting frame configured to mount the cam piston pump, the spring chamber, the circuit chamber, and the oil bag, the mounting frame is a double-layer structure, wherein the cam piston pump and the circuit chamber are mounted on the first layer of the mounting frame, the spring chamber and the oil bag are provided at the second layer of the mounting frame, a position of the spring chamber is in correspondence with that of the cam piston pump, and a position of the oil bag is in correspondence with that of the circuit chamber.

The present invention, in another aspect, further provides a pressure compensation method of an active pressure compensator for deep-sea sampling, which comprises these steps:

a pressure sensor in a circuit chamber detecting pressures of liquid output by a cam piston pump and of a mechanism to be pressurized;

a control circuit board of the circuit chamber receiving pressure data detected by the pressure sensor, and when the pressure is lower than a preset pressure, sending a control instruction to a drive motor of the cam piston pump;

the drive motor receiving the control instruction and pumping liquid in the cam piston pump to the circuit chamber, and pressurizing the mechanism to be pressurized through a pressure compensation outlet of the circuit chamber, thereby realizing actively pressurizing.

Optionally, the pressure compensation method of an active pressure compensator for deep-sea sampling further comprises these steps:

connecting a water supplement interface of a spring chamber to a water supplement pump, and filling water into a water supplement chamber of the spring chamber by the water supplement pump;

removing the water supplement pump, and connecting the water supplement interface to the cam piston pump; a pressure of a second elastic member of the spring chamber applying on a piston and thus transferring the pressure to liquid in the water supplement chamber; opening a valve poppet and providing liquid with a pressure higher than an environmental pressure by at least 0.5 MPa for the cam piston pump.

The present invention has the following advantageous effects:

(1) the active pressure compensator for deep-sea sampling of the present invention can perform active pressure maintenance for a sampler within a depth range of 6000 meters in the ocean, has a compact overall structure, can perform pressure compensation for any mechanism that needs to be pressurized, and has strong adaptability;

(2) the present invention adopts the cam piston pump to perform actively pressurizing and can be applicable to 60 MPa small-flow control, the applicable range is wider;

(3) the spring chamber of the present invention can provide compensation liquid with a pressure higher than an environmental pressure by at least 0.5 MPa for the cam piston pump; by using the liquid compensation method, compared with gas compensation methods, the use is safer and more convenient;

(4) the circuit chamber of the present invention integrates control, energy supply, pressure measurement, and pressure liquid output functions, with rich functions and a compact structure, and can achieve automatic and active pressure compensation control.

By understanding the following description and accompany drawings, further purposes and advantages of the present invention will be fully embodied.

Figure 1:
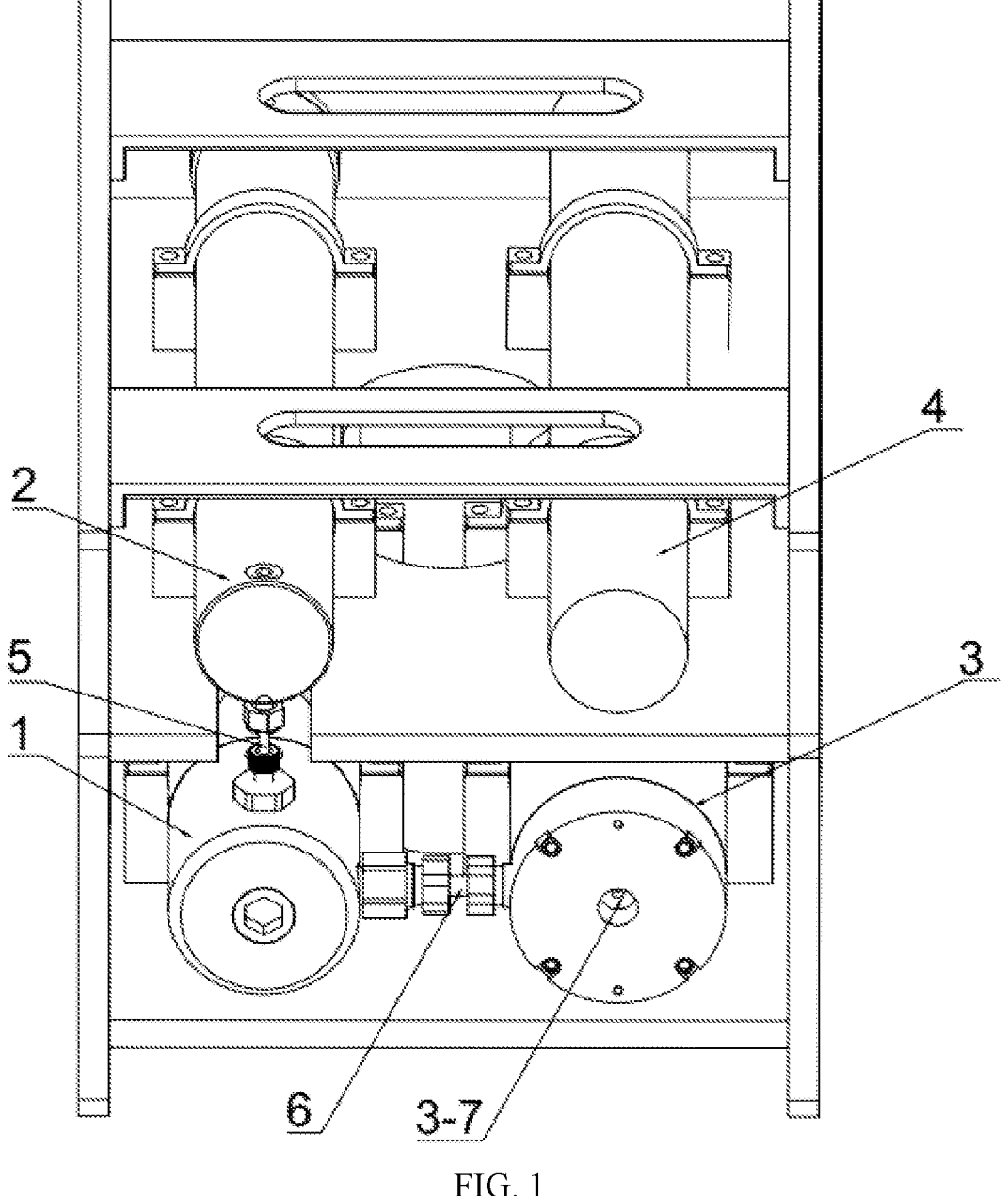
FIG. 1 is a three-dimensional structural schematic view of an active pressure compensator for deep-sea sampling of a preferred embodiment of the present invention.

EXPLANATION OF REFERENCE NUMBERS IN THE DRAWINGS cam piston pump 1; piston chamber 1-1; liquid chamber 1-2; liquid outlet valve 1-3; combination sealing member for shaft 1-4; piston 1-5; first elastic member 1-6; piston coupling 1-7; screw bolt 1-8; silicon carbide ball 1-9; e-type retaining ring 1-10; stop rotating block 1-11; roller shaft 1-12; roller assembly 1-13; intermediate chamber 1-14; cam 1-15; motor chamber 1-16; motor coupling 1-17; drive motor 1-18; motor cover 1-19; first interface 1-19-1; second interface 1-19-2; third interface 1-19-3; bearing assembly 1-20; liquid inlet valve 1-21;

spring chamber 2; water supplement cylinder front end part 2-1; valve poppet 2-2; guide ring 2-3; first sealing ring 2-4; piston 2-5; second elastic member 2-6; accommodation chamber 2-7; spring chamber end cover 2-8; water supplement cylinder rear end part 2-9; water supplement interface 2-10; water supplement chamber 2-11;

circuit chamber 3; casing 3-1; copper post 3-2; sensor plug 3-3; second sealing ring 3-4; circuit chamber end cover 3-5; pressure compensation inlet 3-6; pressure compensation outlet 3-7; mounting cavity 3-8; first connection interface 3-9; second connection interface 3-10;

first pipeline 5; second pipeline 6; mounting frame 7.

DETAILED DESCRIPTION

The following description is used to disclose the present invention to enable those skilled in the art to realize the present invention. The preferred embodiments in the following description are only used as examples, and those skilled in the art may consider other obvious variations. The basic principles of the present invention defined in the following description can be applied to other embodiments, deformation schemes, improvement schemes, equivalent schemes, and other technical solutions that do not deviate from the spirit and scope of the present invention.

Technicians in this field should understand that in the disclosure of the present invention, the orientations or position relationships indicated by the terms "longitudinal", "traverse", "up", "down", "front", "back", "left", "right", "vertical", "horizontal", "top", "bottom", "inside", "outside", and the like are based on the orientations or position relationships shown in the drawings, which are only for the convenience of describing the present invention and simplifying the description, instead of indicating or implying that the devices or components referred to must have specific orientations, or be constructed and operated in specific orientations, therefore the above terms should not be understood as limitation of the present invention.

It can be understood that the term "a/an" should be understood as "at least one" or "one or more", that is, the number of a component can be one in one embodiment, while the number of the component can be multiple in other embodiments. The term "a/an" should not be understood as limitation to the quantity.

In the description of the present invention, it should be noted that unless otherwise specified and limited, the terms "mount", "couple", and "connect" should be broadly understood, for example, they can be fixed connections, and can also be detachable connections, or integrated connections; they can be mechanical connections, and can also be electrical connections, or can be mutual communication; they can be directly connected, and can also be indirectly connected through an intermediate medium; they can be internal connection of two components or interaction relationship between two components. For ordinary technical personnel in this field, specific meanings of the above terms in the present invention can be understood based on specific circumstances.

In order to solve the technical problems existing in conventional active pressure compensation devices of complicated structures, big volumes, small applicable pressures, limited use, and low safety, the present invention provides an active pressure compensator for deep-sea sampling and a pressure compensation method thereof. As shown in FIG. 1-FIG. 6, a specific structure of an active pressure compensator for deep-sea sampling according to a preferred embodiment of the present invention is illustrated.

Figure 2:
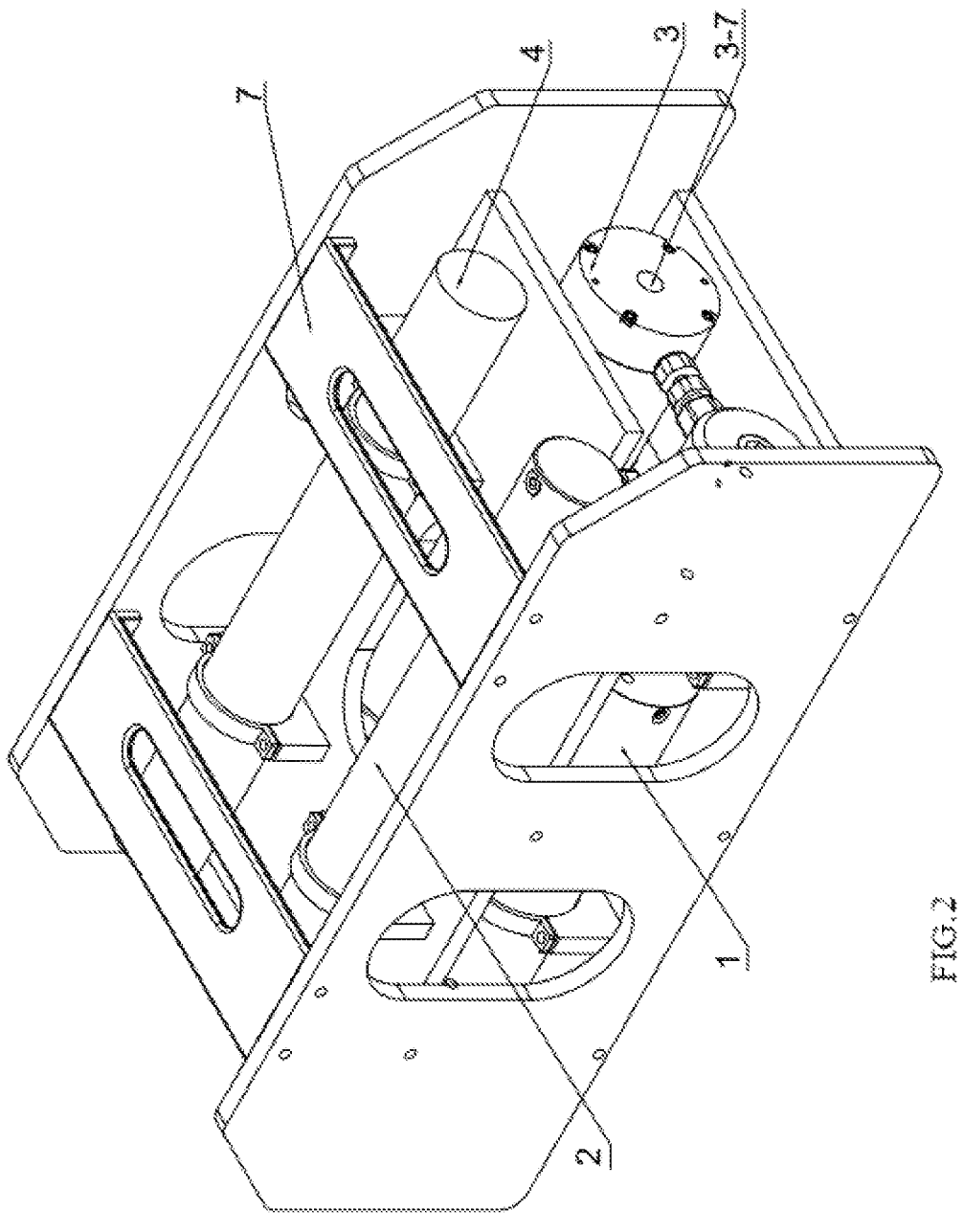
FIG. 2 is a three-dimensional structural schematic view of the active pressure compensator for deep-sea sampling shown in FIG. 1 in another view angle.

Overall schematic views of an active pressure compensator for deep-sea sampling provided by the present invention are as shown in FIG. 1 and FIG. 2. This active pressure compensator can perform active pressure maintenance for samplers within a depth range of 6000 meters in the ocean. The active pressure compensator specifically includes a spring chamber 2, a cam piston pump 1 connected to the spring chamber 1, and a circuit chamber 3 connected to the cam piston pump 1.

The core of the active pressure compensator is the cam piston pump 1, which is configured to be capable of inhaling liquid from the spring chamber 2 and pumping out liquid to the circuit chamber 3. The cam piston pump 1 can normally work under a load condition of 60 Mpa, wherein the output flow can compensate the flow lost by samples, and has advantages of a small size, and safe and convenient use.

The spring chamber 2 of the active pressure compensator can provide liquid with a pressure higher than an environmental pressure by at least 0.5 MPa for the cam piston pump 1, which is used to compensate the flow lost by samples.

The circuit chamber 3 of the active pressure compensator is equipped with a pressure sensor and a control circuit board connected in communication with the pressure sensor, wherein the pressure sensor is configured to measure pressures of liquid output by the cam piston pump 1 and of a mechanism to be pressurized, the control circuit board is configured to send control instructions to control working of the cam piston pump 1 based on pressure data feedback from the pressure sensor and thereby realize active pressure compensation for the mechanism to be pressurized. The circuit chamber 3 is further equipped therein with a battery, the battery supplies electric energy to the pressure sensor and the control circuit board.

Also as shown in FIG. 1 and FIG. 2, the active pressure compensator further includes an oil bag 4 connected to the cam piston pump 1, the cam piston pump 1 is connected to the oil bag 4 through a flexible pipe to realize pressure self-adaption of an internal drive motor 1-18 thereof, so that it can work under pressures of all sea depths.

Furthermore, the active pressure compensator further includes a mounting frame 7 configured to mount the cam piston pump 1, the spring chamber 2, the circuit chamber 3, and the oil bag 4, the mounting frame 7 is a double-layer structure, wherein the cam piston pump 1 and the circuit chamber 3 are mounted on the first layer of the mounting frame 7, the spring chamber 2 and the oil bag 4 are provided at the second layer of the mounting frame 7, a position of the spring chamber 2 is in correspondence with that of the cam piston pump 1, and a position of the oil bag 4 is in correspondence with that of the circuit chamber 3.

It is worth mentioning that the mounting frame 7 is further provided with two handles to facilitate lifting.

A specific flow path of liquid in the active pressure compensator is that: the spring chamber 2 provides compensator fluid with a pressure slightly higher than an environmental pressure, which enters the inlet of the cam piston pump 1 through a first pipeline 5; after pressurization, flows out from the outlet; passes through the second pipeline 6 and then enters the circuit chamber 3; and after pressure measurement by the pressure sensor, flows out from the circuit chamber 3. The circuit chamber 3 is connected to the mechanism to be pressurized through a high-pressure pipeline to perform active pressure compensation for it.

It can be understood that in this embodiment of the present invention, the mechanism to be pressurized is a sampling cylinder or a sampler, and can also be other mechanism that requires to be pressurized. The present invention does not limit specific application of the active pressure compensator.

The specific structure of the active pressure compensator is illustrated below in accompany with FIG. 3-FIG. 6.

Figure 3:
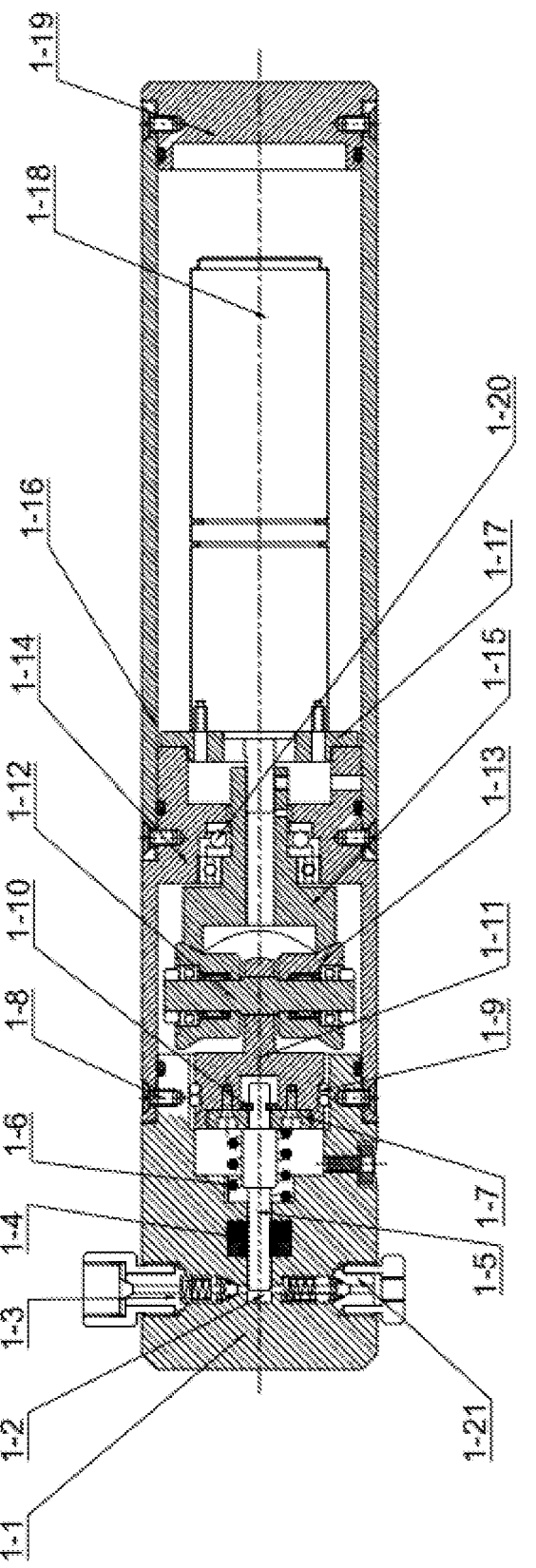
FIG. 3 is a cut-away schematic view of a cam piston pump of the active pressure compensator for deep-sea sampling shown in FIG. 1.

Specifically, as shown in FIG. 3, the cam piston pump 1 includes a liquid chamber 1-2, and a liquid inlet valve 1-21 and a liquid outlet valve 1-3 in communication with the liquid chamber 1-2; the liquid inlet valve 1-21 and the liquid outlet valve 1-3 are respectively connected to the spring chamber 2 and the circuit chamber 3.

Furthermore, the cam piston pump 1 further includes a piston 1-5 that is movable along an axial direction of the cam piston pump 1, a stop rotating block 1-11 connected to the piston 1-5, a roller 1-13 assembly connected to the stop rotating block 1-11, a cam 1-15 in linkage with the roller assembly 1-13, and a drive motor 1-18 configured to drive the cam 1-15 to rotate; wherein when the drive motor 1-18 drives the cam 1-15 to rotate, the cam 1-15 applies an axial pushing force to the roller assembly 1-13, such that the roller assembly 1-13, through the stop rotating block 1-11, pushes the piston 1-5 to move axially toward a direction approaching the liquid chamber 1-2, and thus liquid in the liquid chamber 1-2 is pumped out through the liquid outlet valve 1-3.

It is worth mentioning that both the liquid inlet valve 1-21 and the liquid outlet valve 1-3 are one-way valves.

Furthermore, the piston 1-5 is sheathed with a first a first elastic member 1-6, the first elastic member 1-6 is configured to store elastic potential energy when the piston 1-5 is pushed by the stop rotating block 1-11 to move, and further configured to release elastic potential energy when the pushing force of the stop rotating block 1-11 to the piston 1-5 disappears, such that the piston 1-5, the stop rotating block 1-11, and the cam 1-15 return to original positions; wherein when the piston 1-5, the stop rotating block 1-11, and the cam 1-15 return to original positions, the cam piston pump 1 inhales liquid into the liquid chamber 1-2 through the liquid inlet valve 1-21.

Furthermore, the cam piston pump 1 includes a piston chamber 1-1, an intermediate chamber 1-14 connected to the piston chamber 1-1, a motor chamber 1-16 connected to the intermediate chamber 1-14, and a motor cover 1-19 connected to the motor chamber 1-16; wherein the liquid chamber 1-2, the liquid inlet valve 1-21, and the liquid outlet valve 1-3 are provided in the piston chamber 1-1, the piston 1-5, the stop rotating block 1-11, the roller assembly 1-13, the cam 1-15, and the drive motor 1-18 are provided in a hollow cavity running through the intermediate chamber 1-14 and the motor chamber 1-16, and between the piston 1-5 and the piston chamber 1-1 is provided with a combination sealing member for shaft 1-4, which is configured to seal the liquid chamber 1-2.

It is worth mentioning that among the piston chamber 1-1, the intermediate chamber 1-14, the motor chamber 1-16, and the motor cover 1-19, bolts 1-8 or screws are used for connection.

It is worth mentioning that the cam piston pump 1 further includes a motor coupling 1-17 configured to fix the drive motor 1-18 in the motor chamber 1-16.

Specifically, the stop rotating block 1-11 has a front end, a middle end, and a rear end connected sequentially, the cam piston pump 1 further includes a piston coupling 1-7 configured to connect the piston 1-5 to the front end of the stop rotating block 1-11 fixedly and an e-type retaining ring 1-10, and the cam piston pump 1 further includes a roller shaft 1-12 provided at the rear end of the stop rotating block 1-11, the roller assembly 1-13 is rotatably provided on the roller shaft 1-12.

It is worth mentioning that the cam piston pump 1 further includes silicon carbide balls 1-9 provided between the stop rotating block 1-11 and the piston chamber 1-1, the silicon carbide balls 1-9 are configured to perform circumferential restriction for the stop rotating block 1-11 to avoid the stop rotating block 1-11 from rotating; that is, the stop rotating block 1-11 is circumferentially restricted by the silicon carbide balls 1-9 in grooves in the piston chamber 1-1, only can move axially along the grooves, and cannot rotate. The piston 1-5 is fixed radially by the piston chamber 1-1, the piston coupling 1-7, and the e-type retaining ring 1-10, and is fixed axially by the piston coupling 1-7 and the e-type retaining ring 1-10.

In this preferred embodiment of the present invention, the first elastic member 1-6 is a spring, two ends of the spring respectively resist against the piston coupling 1-7 and an inner wall of the piston chamber 1-1; when the stop rotating block 1-11 pushes the piston 1-5 to move axially toward a direction approaching the liquid chamber 1-2, the spring is compressed and store elastic potential energy.

Furthermore, the cam 1-15 has a linkage end and a drive end extending from the linkage end, the linkage end and the drive end are respectively connected to the rolling assembly 1-13 and a rotation shaft of the drive motor 1-18, and between an outer side of the drive end and an inner side wall of the intermediate chamber 1-14 there is further provided with a bearing assembly 1-20.

It can be understood that the cam 1-15 is mounted on the bearing assembly 1-20 and can rotate around an axis; in an axial direction thereof, it is pressed on a pushing stopper bearing of the bearing assembly 1-20 by the rolling assembly 1-13 cooperating with elastic force of the first elastic member 1-6.

Figure 4:
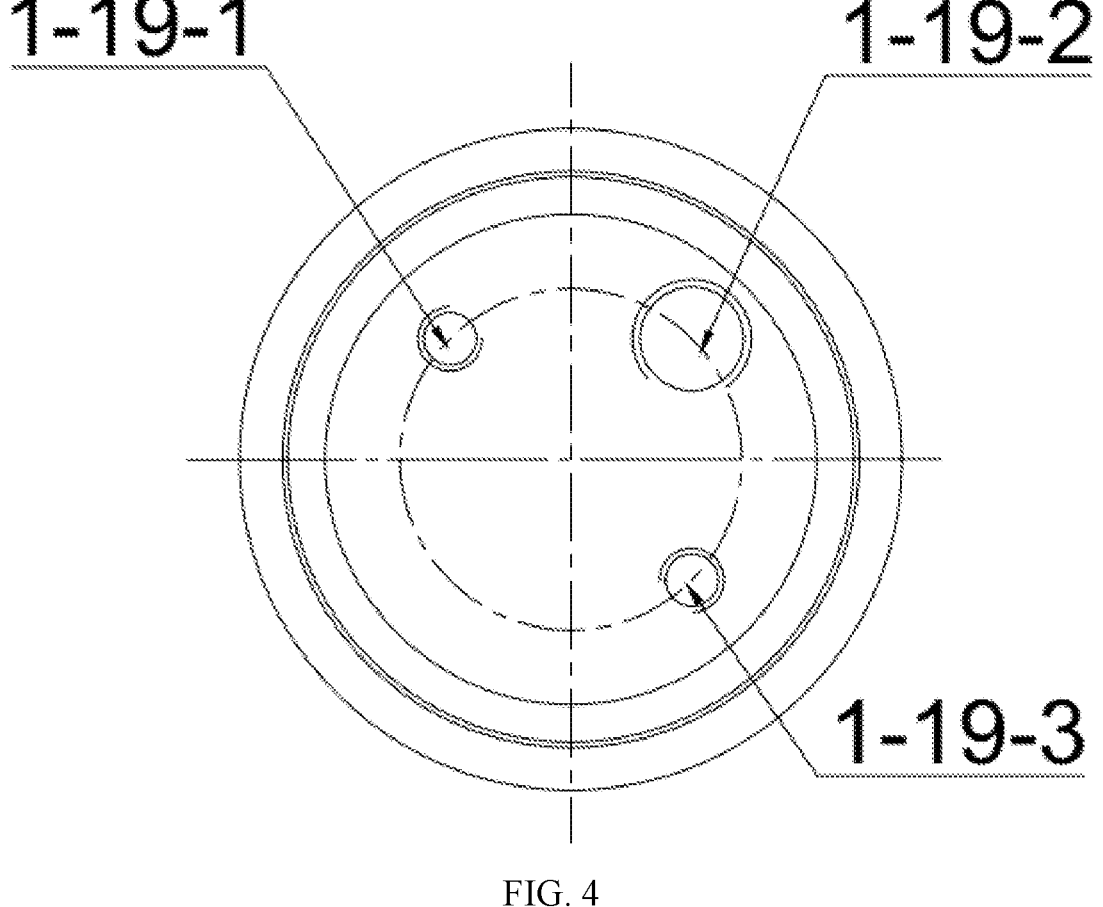
FIG. 4 is a front view of a motor cover of the cam piston pump shown in FIG. 3.

Furthermore, as shown in FIG. 4, the motor cover 1-19 is provided with a first interface 1-19-1 configured to be connected with the oil bag 4, a second interface 1-19-2 configured to be connected with the circuit chamber 3, and a third interface 1-19-3 configured to be connected with the motor chamber 1-16, wherein the first interface 1-19-1 is in communication with the third interface 1-19-3.

It can be understood that the cam piston pump 1 is connected to the oil bag 4 through the first interface 1-19-1, and fill oil into the motor chamber 1-16 through the third interface 1-19-3, thereby realizing pressure self-adaption of the drive motor 1-18. The cam piston pump 1 connects watertight cables to the drive motor 1-18 through watertight connectors in the second interface 1-19-2, thereby realizing control and energy supply to the drive motor 1-18.

A specific working process of the cam piston pump 1 is as follows.

Under a control instruction sent by the control circuit board in the circuit chamber 3, the drive motor 1-18 works and drives the cam 1-15 to rotate; a stroke of the cam 1-15 has two stages:

in an ascending stage of the stroke of the cam 1-15, the cam 1-15 applies a pushing acting force to the roller assembly 1-13, the roller assembly 1-13, through the stop rotating block 1-11, pushes the piston 1-5 to move toward a direction approaching the liquid chamber 1-2, such that a volume of the liquid chamber 1-2 reduces and a pressure in the liquid chamber 1-2 increases, thereby realizing a purpose of pressurizing and pump out liquid from the liquid outlet valve 1-3; at the same time, the stop rotating block 1-11 compresses the first elastic member 1-6, so that the first elastic member 1-6 store elastic potential energy;

when the cam 1-15 reaches its return stage, the pushing acting force applied to the roller assembly 1-13 by the cam 1-15 disappears, the first elastic member 1-6 releases elastic potential energy to provide a restoring force for moving toward a direction away from the liquid chamber 1-2 to the piston 1-5, the stop rotating block 1-11, and the roller assembly 1-13; the cam 1-15 continues to rotate under pushing of the roller assembly 1-13 to complete a cycle, at the same time, the piston moves rightwards, the volume of the liquid chamber 1-2 enlarges and the pressure in the liquid chamber 1-2 reduces, liquid is inhaled into the liquid chamber 1-2 from the spring chamber 2 through the liquid inlet valve 1-21.

It can be understood that the present invention adopts the cam piston pump 1 to perform actively pressurizing and can be applicable to 60 MPa small-flow control, the applicable range is wider.

It is worth mentioning that among them, the roller assembly 1-13 reduces sliding friction with the cam 1-15 by its own rotation, so that the proportion of rolling friction increases in the contact forms of the two, thereby reducing weariness of the cam 1-15. Between the piston 1-5 and the piston chamber 1-1 there is a combination sealing member for shaft 1-4, which realizes sealing of the liquid chamber 1-2. The whole outer casing can be divided into four parts: the piston chamber 1-1, the intermediate chamber 1-14, the motor chamber 1-16, the motor cover 1-19, which are all connected by bolts 1-8 or screws.

Figure 5:
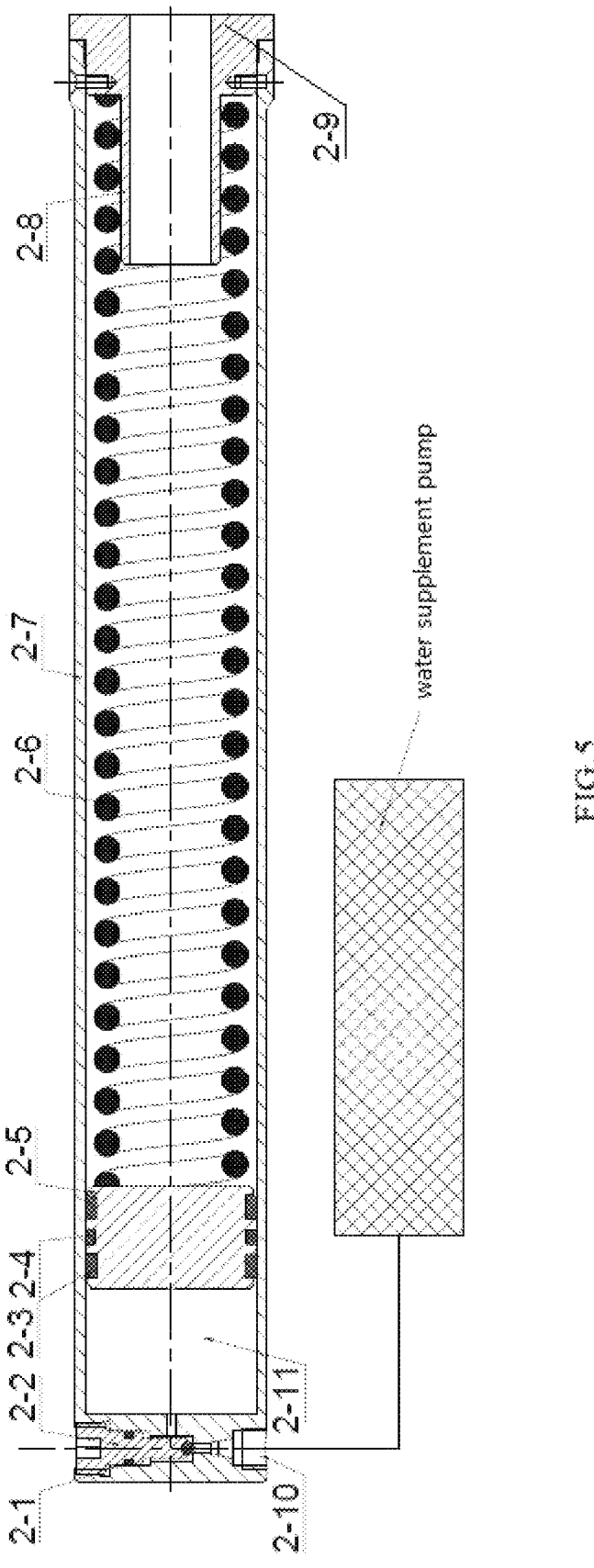
FIG. 5 is a cut-away schematic view of a spring chamber of the active pressure compensator for deep-sea sampling shown in FIG. 1.

Furthermore, as shown in FIG. 5, the spring chamber 2 includes a water supplement interface 2-10 and a spring chamber end cover 2-8 that are respectively provided at two ends thereof, a valve poppet 2-2 configured to control the water supplement interface 2-10 to open and close, a water supplement chamber 2-11 in communication with the water supplement interface 2-10, a piston 2-5 provided at a side of the water supplement chamber 2-11 that is away from the valve poppet 2-2, a second elastic member 2-6 having one end supported against the piston 2-5 and another end inserted with the spring chamber end cover 2-8, and an accommodation chamber 2-7 configured to mount the second elastic member 2-6.

Specifically, the spring chamber 2 has a water supplement cylinder front end part 2-1 and a water supplement cylinder rear end part 2-9, wherein the valve poppet 2-2 and the water supplement interface 2-10 are provided at the water supplement cylinder front end part 2-1, the spring chamber end cover 2-8 is an opened structure and provided at the water supplement cylinder rear end part 2-9; the spring chamber end cover 2-8 compresses the second elastic member 2-6 in the accommodation chamber 2-7 and provides guide for the second elastic member 2-6 at the same time.

Furthermore, the piston 2-5 is further provided thereon with two guide rings 2-3 and a sealing ring 2-4 provided between the two guide rings 2-3.

It is worth mentioning that the water supplement interface 2-10 of the spring chamber 2 has two functions, a first function is to be used to connect a water supplement pump to fill water into the water supplement chamber 2-11, a second function is to be used to connect the liquid inlet valve 1-21 of the cam piston pump 1 to provide compensation liquid for the cam piston pump 1.

Specifically, a working process of the spring chamber 2 is as follows:

the water supplement interface 2-10 is connected to a water supplement pump, the valve poppet 2-2 is opened, and water is filled into the water supplement chamber 2-11; when water reaches a rated volume, the valve poppet 2-2 is closed, the water supplement pump is removed, and the spring chamber 2 is connected to the cam piston pump 1 through the water supplement interface 2-10 and the first pipeline 5; a pressure of the second elastic member 2-6 applies on the piston 2-5, thus the pressure is transferred to liquid in the water supplement chamber 2-11. At this time, a pressure of the water in the water supplement chamber 2-11 is a sum of the pressure of the spring and an environmental pressure. The valve poppet 2-2 is opened, and thus the liquid inlet valve 1-21 can be provided with liquid with a pressure higher than the environmental pressure by at least 0.5 MPa as compensation liquid, which is conducive for the cam piston pump 1 to generate a higher pressure.

The spring chamber 2 of the present invention can provide compensation liquid with a pressure higher than an environmental pressure by at least 0.5 MPa for the cam piston pump; by using the liquid compensation method, compared with gas compensation methods, the use is safer and more convenient.

Figure 6:
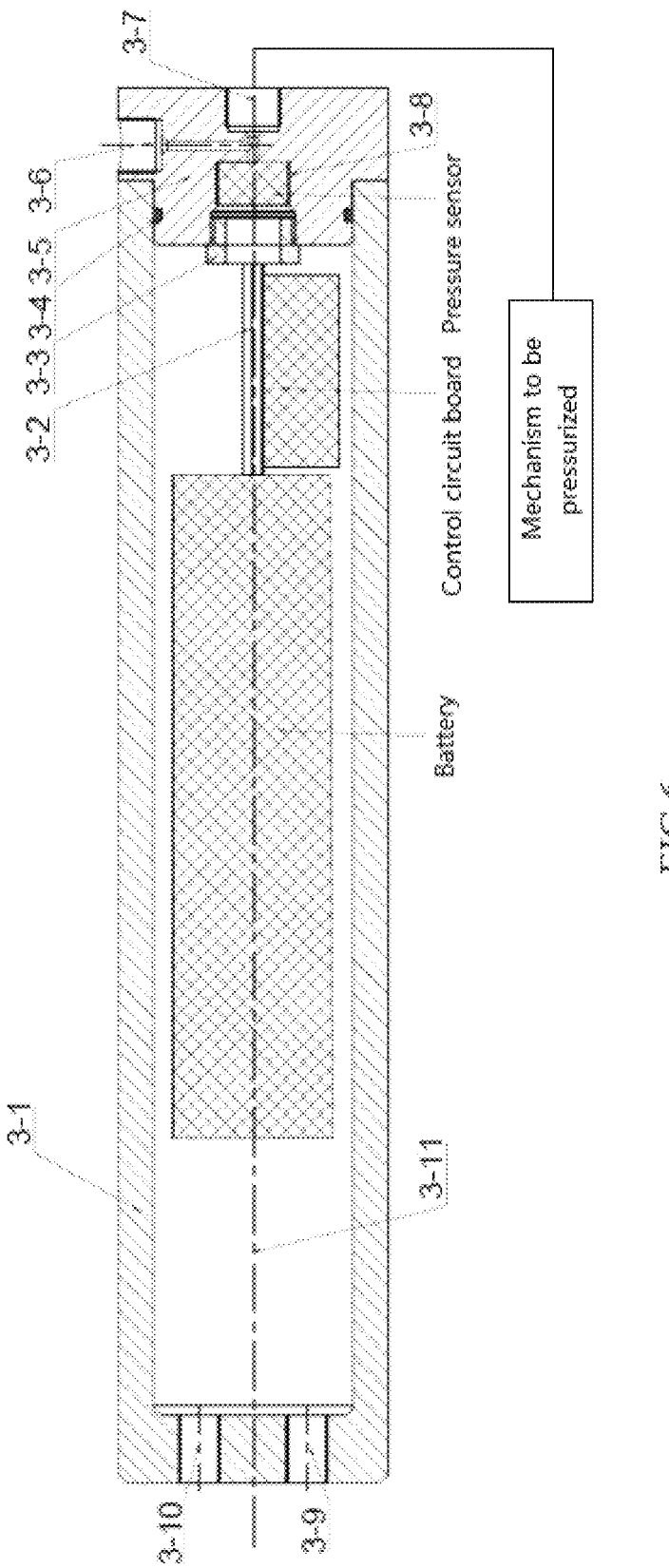
FIG. 6 is a cut-away schematic view of a circuit chamber of the active pressure compensator for deep-sea sampling shown in FIG. 1.

Furthermore, as shown in FIG. 6, the circuit chamber 3 includes a casing 3-1, a circuit cavity 3-11 formed in the casing 3-1, and an interface part and a pressure compensation part that are respectively provided at two ends of the casing 3-1.

Specifically, the interface part is provided with a first connection interface 3-9 configured to be connected with a watertight connector to perform debugging and communication for the control circuit board in the circuit cavity 3-11, and a second connection interface 3-10 configured to be connected to the cam piston pump 1.

It can be understood that the watertight connector connected on the first connection interface 3-9 can perform debugging and communication for the control circuit board; the watertight connector on the second connection interface 3-10 is connected to the watertight connector in the second interface 1-19-2 through a watertight cable, and can transfer battery energy and instructions of the control circuit board to the drive motor 1-18.

Specifically, the pressure compensation part includes a pressure compensation inlet 3-6 connected to the liquid outlet valve 1-3 of the cam piston pump 1, a mounting cavity 3-8 configured to mount the pressure sensor, a sensor plug 3-3 configured to fix the pressure sensor in the mounting cavity 3-8, a copper post 3-2 connected to the sensor plug 3-3 and located in the circuit cavity 3-11, and a pressure compensation outlet 3-7 in communication with the pressure compensation inlet 3-6 and the mounting cavity 3-8.

It is worth mentioning that the pressure compensation part further includes a circuit chamber end cover 3-5 configured to seal the circuit cavity 3-11, between an outer side wall of the circuit chamber end cover 3-5 and the casing 3-1 there is provided with a second sealing ring 3-4, wherein the mounting cavity 3-8 is formed in the circuit chamber end cover 3-5, and the copper post 3-2 is provided at a side of the sensor plug 3-3 away from the mounting cavity 3-8.

Furthermore, the control circuit board of the circuit chamber 3 is mounted on the copper post 3-2, the circuit cavity 3-11 is further provided therein with a battery, and the circuit chamber 3 is connected to the mechanism to be pressurized through the pressure compensation outlet 3-7.

A specific working process of the circuit chamber 3 is as follows.

The pressure sensor measures a pressure of compensation liquid flowing from the pressure compensation inlet 3-6 and a pressure of the mechanism to be pressurized connected by the pressure compensation outlet 3-7, and feeds back pressure data to the control circuit board; if the pressure of the mechanism to be pressurized is lower than a preset pressure threshold, the control circuit board sends a control instruction to the drive motor 1-18 of the cam piston pump 1 to control the drive motor 1-18 to work to realize active pressure compensation.

It can be understood that the circuit chamber of the present invention integrates control, energy supply, pressure measurement, and pressure liquid output functions, with rich functions and a compact structure, and can achieve automatic and active pressure compensation control.

It can be further understood that the present invention, in another aspect, further provides a pressure compensation method of the above active pressure compensator for deep-sea sampling, which includes these steps:

the pressure sensor in the circuit chamber 3 detecting pressures of liquid output by the cam piston pump 1 and of the mechanism to be pressurized;

the control circuit board of the circuit chamber 3 receiving pressure data detected by the pressure sensor, and when the pressure is lower than a preset pressure, sending a control instruction to the drive motor 1-18 of the cam piston pump 1;

the drive motor 1-18 receiving the control instruction and pumping liquid in the cam piston pump 1 to the circuit chamber 3, and pressurizing the mechanism to be pressurized through a pressure compensation outlet 3-7 of the circuit chamber 3, thereby realizing actively pressurizing.

Furthermore, the pressure compensation method of the active pressure compensator for deep-sea sampling further includes these steps:

connecting the water supplement interface 2-10 of the spring chamber 2 to a water supplement pump, and filling water into the water supplement chamber 2-11 of the spring chamber 2 by the water supplement pump;

removing the water supplement pump, and connecting the water supplement interface 2-10 to the cam piston pump 1; a pressure of the second elastic member 2-6 of the spring chamber 2 applying on the piston 2-5 and thus transferring the pressure to liquid in the water supplement chamber 2-11; opening the valve poppet 2-2 and providing liquid with a pressure higher than an environmental pressure by at least 0.5 MPa for the cam piston pump 1.

The active pressure compensator for deep-sea sampling of the present invention can perform active pressure maintenance for mechanisms to be pressurized within a depth range of 6000 meters in the ocean, has a simple and compact overall structure, a small volume, and high safety, can perform pressure compensation for any mechanism that needs to be pressurized, and has strong adaptability.

The various technical features of the above embodiments can be combined in any way. To make the description be concise, all possible combinations of the various technical features in the above embodiments have not been described. However, as long as there is no contradiction in the combination of these technical features, they should be all considered as the scope recorded by this specification. The above embodiments only express the preferred embodiments of the present invention, their description is more specific and detailed, but cannot be understood as any limitation on the patent scope of the present invention. It should be pointed out that for ordinary technical personnel in this field, several modifications and improvements can be made without departing from the concept of the present invention, all of which fall within the protection scope of the present invention. Therefore, the protection scope of the present invention patent should be based on the attached claims.

What is claimed is:

1. An active pressure compensator for deep-sea sampling, comprising a spring chamber, a cam piston pump connected to the spring chamber, and a circuit chamber connected to the cam piston pump, wherein:

the spring chamber is configured to provide liquid with a pressure higher than an environmental pressure by at least 0.5 MPa for the cam piston pump;

the cam piston pump is configured to be capable of inhaling the liquid from the spring chamber and pumping out the liquid to the circuit chamber;

the circuit chamber is configured to be connected to a mechanism to be pressurized and is provided therein with a pressure sensor and a control circuit board connected in communication with the pressure sensor, the pressure sensor is configured to detect pressures of liquid output by the cam piston pump and of the mechanism to be pressurized, the control circuit board is configured to send a control instruction to control working of the cam piston pump based on pressure data feedback from the pressure sensor and thereby realize active pressure compensation for the mechanism to be pressurized.

2. The active pressure compensator for deep-sea sampling according to claim 1, wherein the cam piston pump comprises a liquid chamber, and a liquid inlet valve and a liquid outlet valve in communication with the liquid chamber; the liquid inlet valve and the liquid outlet valve are respectively connected to the spring chamber and the circuit chamber; the cam piston pump further comprises a piston that is movable along an axial direction of the cam piston pump, a stop rotating block connected to the piston, a roller assembly connected to the stop rotating block, a cam in linkage with the roller assembly, and a drive motor configured to drive the cam to rotate; wherein when the drive motor drives the cam to rotate, the cam applies an axial pushing force to the roller assembly, such that the roller assembly, through the stop rotating block, pushes the piston to move axially in a direction toward the liquid chamber, such that liquid in the liquid chamber is pumped out through the liquid outlet valve.

3. The active pressure compensator for deep-sea sampling according to claim 2, wherein both the liquid inlet valve and the liquid outlet valve are one-way valves.

4. The active pressure compensator for deep-sea sampling according to claim 2, wherein the piston is sheathed with a first a first elastic member, the first elastic member is configured to store elastic potential energy when the piston is pushed by the stop rotating block to move, and further configured to release elastic potential energy when the pushing force of the stop rotating block to the piston disappears, such that the piston, the stop rotating block, and the cam return to original positions; wherein when the piston, the stop rotating block, and the cam return to original positions, the cam piston pump inhales liquid into the liquid chamber through the liquid inlet valve.

5. The active pressure compensator for deep-sea sampling according to claim 4, wherein the cam piston pump comprises a piston chamber, an intermediate chamber connected to the piston chamber, a motor chamber connected to the intermediate chamber, and a motor cover connected to the motor chamber; wherein the liquid chamber, the liquid inlet valve, and the liquid outlet valve are provided in the piston chamber, the piston, the stop rotating block, the roller assembly, the cam, and the drive motor are provided in a hollow cavity running through the intermediate chamber and the motor chamber, and between the piston and the piston chamber there is provided a sealing member, which is configured to seal the liquid chamber.

6. The active pressure compensator for deep-sea sampling according to claim 5, wherein among the piston chamber, the intermediate chamber, the motor chamber, and the motor cover, bolts or screws are used for connection.

7. The active pressure compensator for deep-sea sampling according to claim 5, wherein the cam piston pump further comprises a motor coupling configured to fix the drive motor in the motor chamber.

8. The active pressure compensator for deep-sea sampling according to claim 5, wherein the cam piston pump further comprises silicon carbide balls provided between the stop rotating block and the piston chamber, the silicon carbide balls are configured to perform circumferential restriction for the stop rotating block to prevent the stop rotating block from rotating; the stop rotating block has a front end, a middle end, and a rear end connected sequentially, the cam piston pump further comprises a piston coupling configured to fixedly connect the piston to the front end of the stop rotating block and a retaining ring, and the cam piston pump further comprises a roller shaft provided at the rear end of the stop rotating block, the roller assembly is rotatably provided on the roller shaft.

9. The active pressure compensator for deep-sea sampling according to claim 8, wherein the cam has a linkage end and a drive end extending from the linkage end, the linkage end and the drive end are respectively connected to the rolling assembly and a rotation shaft of the drive motor, and between an outer side of the drive end and an inner side wall of the intermediate chamber there is further provided a bearing assembly.

10. The active pressure compensator for deep-sea sampling according to claim 5, wherein the motor cover is provided with a first interface configured to be connected with an oil bag, a second interface configured to be connected with the circuit chamber, and a third interface configured to be connected with the motor chamber, wherein the first interface is in communication with the third interface.

11. The active pressure compensator for deep-sea sampling according to claim 2, wherein the spring chamber comprises a water supplement interface and a spring chamber end cover that are respectively provided at two ends thereof, a valve poppet configured to control the water supplement interface to open and close, a water supplement chamber in communication with the water supplement interface, a water supplement chamber piston provided at a side of the water supplement chamber that is away from the valve poppet, a second elastic member having one end supported against the water supplement chamber piston and another end supported against the spring chamber end cover, and an accommodation chamber configured to mount the second elastic member.

12. The active pressure compensator for deep-sea sampling according to claim 11, wherein the water supplement chamber piston is provided thereon with two guide rings and a sealing ring provided between the two guide rings.

13. The active pressure compensator for deep-sea sampling according to claim 11, wherein the circuit chamber comprises a casing, a circuit cavity formed in the casing, and an interface part and a pressure compensation part that are respectively provided at two ends of the casing; wherein the interface part is provided with a first connection interface configured to be connected with a watertight connector to perform debugging and communication for the control circuit board in the circuit cavity, and a second connection interface configured to be connected to the cam piston pump; the pressure compensation part comprises a pressure compensation inlet connected to the liquid outlet valve of the cam piston pump, a mounting cavity configured to mount the pressure sensor, a sensor plug configured to fix the pressure sensor in the mounting cavity, a copper post connected to the sensor plug and located in the circuit cavity, and a pressure compensation outlet in communication with the pressure compensation inlet and the mounting cavity; the control circuit board is mounted on the copper post, the circuit cavity is further provided therein with a battery, and the circuit chamber is configured to be connected to the mechanism to be pressurized through the pressure compensation outlet.

14. The active pressure compensator for deep-sea sampling according to claim 1, wherein the mechanism to be pressurized is a sampling tube.

15. The active pressure compensator for deep-sea sampling according to claim 1, wherein the active pressure compensator further comprises an oil bag connected to the cam piston pump; the active pressure compensator further comprises a mounting frame configured to mount the cam piston pump, the spring chamber, the circuit chamber, and the oil bag, the mounting frame is a double-layer structure, wherein the cam piston pump and the circuit chamber are mounted on a first layer of the mounting frame, the spring chamber and the oil bag are provided at a second layer of the mounting frame, a position of the spring chamber is in correspondence with that of the cam piston pump, and a position of the oil bag is in correspondence with that of the circuit chamber.

16. A pressure compensation method using the active pressure compensator for deep-sea sampling according to claim 1, comprising the steps of:

the pressure sensor in the circuit chamber detecting pressures of liquid output by the cam piston pump and of a mechanism to be pressurized;

the control circuit board of the circuit chamber receiving pressure data detected by the pressure sensor, and when the pressure is lower than a preset pressure, sending a control instruction to the cam piston pump;

the cam piston pump receiving the control instruction and pumping liquid in the cam piston pump to the circuit chamber to pressurize the mechanism to be pressurized.

17. The pressure compensation method according to claim 16, further comprising the steps of:

connecting a water supplement interface of the spring chamber to a water supplement pump, and filling water into a water supplement chamber of the spring chamber by the water supplement pump;

removing the water supplement pump, and connecting the water supplement interface to the cam piston pump; a pressure of a second elastic member of the spring chamber applying on a piston and thus transferring the pressure to the water in the water supplement chamber;

opening a valve poppet and providing the water with a pressure higher than an environmental pressure by at least 0.5 MPa for the cam piston pump.

* * * * *